United States Patent [19]

Mason

[11] Patent Number: 4,615,642

[45] Date of Patent: Oct. 7, 1986

[54] VARIABLE POROSITY IRRIGATION PIPE

[75] Inventor: James W. Mason, Huntington Beach, Calif.

[73] Assignee: Dasurat Enterprises PTE Ltd., Singapore, Singapore

[21] Appl. No.: 655,753

[22] Filed: Oct. 1, 1984

[51] Int. Cl.⁴ .................. E02B 13/00; A01G 25/06
[52] U.S. Cl. .................................. 405/45; 264/41; 239/145; 405/36; 405/43; 521/143
[58] Field of Search .............. 405/36, 37, 43, 45, 405/39, 38; 264/41; 521/79, 140, 143; 239/145, 547, 542

[56] References Cited

U.S. PATENT DOCUMENTS

| | | | |
|---|---|---|---|
| 3,552,654 | 1/1971 | Thomas | 239/145 |
| 3,866,833 | 2/1975 | Shibata et al. | 239/547 |
| 4,047,768 | 10/1983 | Garcia et al. | 521/79 X |
| 4,168,799 | 9/1979 | Turner | 239/145 |
| 4,221,501 | 9/1980 | Saburi | 405/37 |
| 4,434,250 | 2/1984 | Kessler | 521/143 X |
| 4,517,316 | 5/1985 | Mason | 264/41 X |

*Primary Examiner*—Dennis Taylor
*Attorney, Agent, or Firm*—Marvin E. Jacobs

[57] ABSTRACT

Porous pipe having a porosity which varies continuously and controllably with length is produced by extruding a mixture of particles of prevulcanized elastomer such as reclaimed crumb rubber and a thermoplastic binder such as polyethylene with all parameters controlled except for die temperature of pull-off rate. By gradually varying temperature or pull-off rate during extrusion, the porosity of the pipe gradually changes. The leak rate can be controlled in a manner to produce a length of porous pipe in which the leak rate is constant as the pressure drops over the length of the pipe.

17 Claims, 5 Drawing Figures

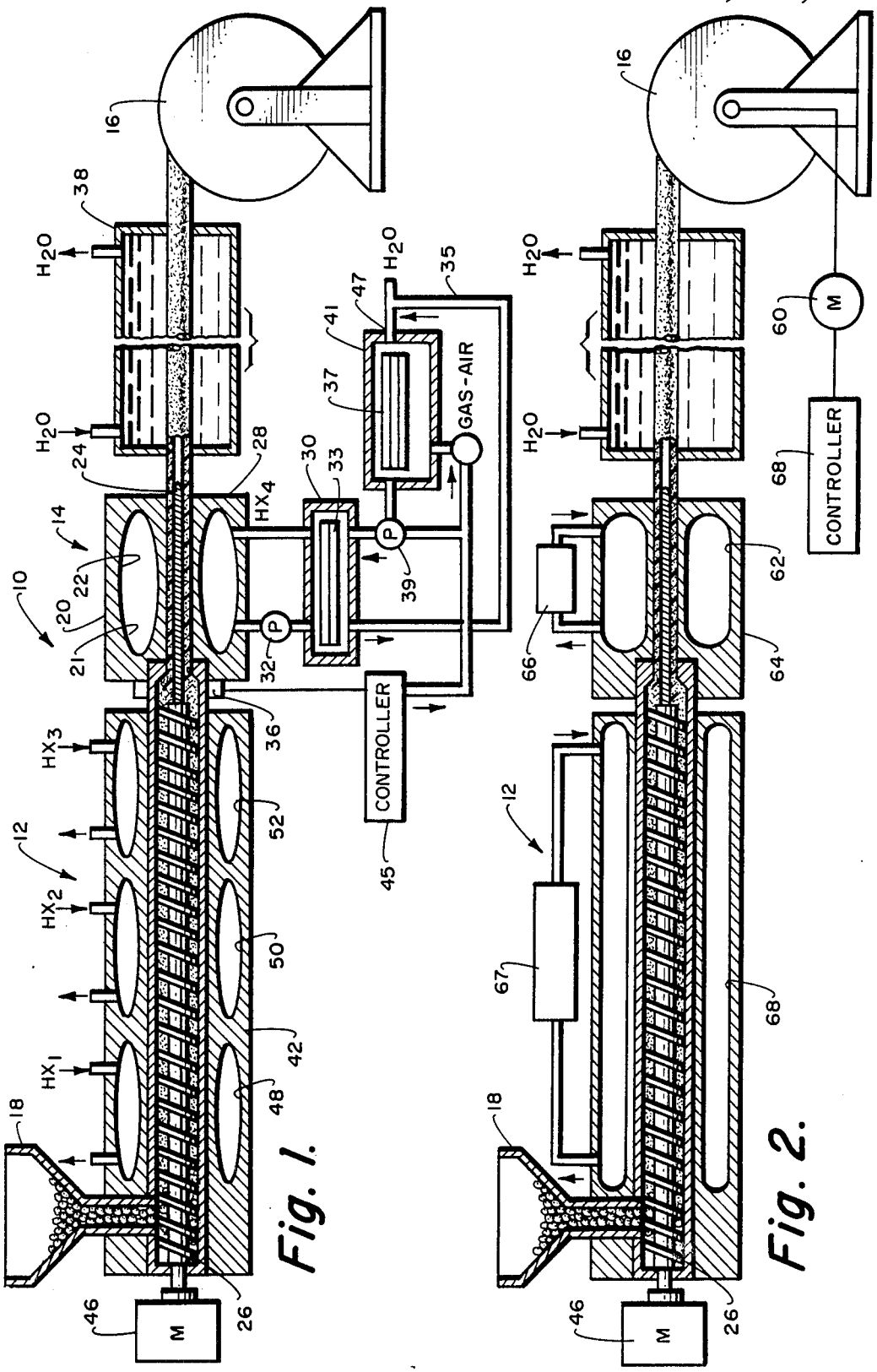

VARIABLE POROSITY IRRIGATION PIPE

DESCRIPTION

1. Technical Field

This invention relates to the production of porous irrigation pipes and, more particularly, to an irrigation pipe in which the porosity increases from inlet to the end of the pipe such that the leak rate is substantially uniform throughout the length of the pipe.

2. Background Art

As population steadily increases, water becomes a more important and increasingly scarcer and more expensive resource. Agriculture is one of the most important uses of surface water. It is necessary to develop more efficient systems for delivering water to plants. Above ground irrigating systems have employed flooding or sprinkler systems. Though these systems are simple, surface watering tends to be wasteful since water that is not absorbed quickly enough runs off or evaporates, and the water that is absorbed must wet the soil until it reaches the roots, the water gathering system for most plants. Furthermore, surface watering can contribute to erosion and to salt buildup in the soil.

Surface irrigation systems must be removed and replaced each time the field is tilled or plowed for replanting. Irrigation systems interfere with mechanical harvesting and require substantial maintenance. Above ground watering should usually be conducted during the day since many plants are subject to decay at night. Furthermore, above-ground watering interferes with usage of recreational areas such as parks, athletic fields and golf courses. Surface watering is non-specific in that the crop and weeds are both equally watered.

Because of the limitations in above-ground irrigation, subsurface irrigation systems have been developed in which water is directly fed at an optimum subsurface depth to the roots of the crop being cultivated. The pipe must be inert to the soil environment, must be capable of withstanding hydrostatic pressure in the presence of hard objects such as rocks without collapse and preferably is flexible, so that it does not suffer brittle failure and can be bent to follow crop-line contours.

There are numerous agricultural applications for an irrigation pipe which leaks water slowly over its entire surface and length. Such pipes can be buried underground at levels appropriate for the particular crop being grown, and will supply water directly to the root system. With proper controls, the water level in the soil can be maintained at near-optimum levels. With some crops, this has been shown to increase yields substantially.

Leak irrigation requires a pipe that will deliver water at a prescribed rate along its length. The soil soaking action is similar to that produced by drip irrigation but the leak rate is continuous along the length of the pipe rather than at discrete points as in drip irrigation. A canvas hose was an early attempt to produce a soaker hose. Canvas hose allows water to ooze out of the pores between the woven threads. However, cotton hoses tend to quickly degrade from the action of sunlight and microbes in the soil. Hoses of synthetic fibers are more resistant to actinic and microbiological attack but are too expensive to justify their use.

A porous irrigation pipe produced from reclaimed rubber mixed with a binder such as polyethylene has been disclosed by Turner in U.S. Pat. Nos. 4,003,408; 4,110,420; and 4,168,799. This mixture is extruded to form the pipe, and the water present within the hot extrudate vaporizes, producing the small pores through which water seeps under pressures of a few psi. While this pipe is useful for some applications, it has several drawbacks for many large-scale agricultural uses. The most important problem with the present product is its highly variable porosity. Some sections have no pores and other sections very large pores. The rate at which water emerges from this product varies by 50 to 75 percent or more within a few feet along its length. If it were used with closely spaced plantings, such as densely packed sugar cane plants, some areas would be overwatered, while others would be essentially dry.

Another problem is that the overall porosity of the pipe is poorly controlled from lot to lot. This causes severe engineering problems when one tries to design a water system for a particular location. What is normally done is to use many pressure regulators throughout the system. This is expensive and further limits the potential applications of the porous pipe material.

In my copending application Ser. No. 573,497, filed Jan. 24, 1984, the disclosure of which is expressly incorporated herein by reference, an improved porous irrigation pipe is disclosed having a uniform leak rate along its length. It was discovered that the wide variation in porosity in the Turner porous pipe is due to failure to control the moisture content of the raw materials. The dry powder is somewhat hygroscopic and prior manufacturing systems disclosed by Turner relied on absorption of water by the crumb material to provide the blowing or pore forming agent. However, the water content of each batch or portion of a batch varies with humidity, temperature, etc. of the environment. Since the amount of water present in the extrudate is very important to the porosity of the final pipe, variations in the water content of the feed will produce unacceptable variations of the product. Turner attempted to control excess water by venting the extruder but this did not effectively control variations in porosity.

Another problem with the Turner system is uneven feeding of the mixture of powders to the extruder which produces variations in the density, thickness and porosity of the extruded pipe. Furthermore, the vented extruder process disclosed by Turner produces a pipe having a fairly rough internal surface producing a high coefficient of friction and resulting in excessive pressure loss. This further exacerbates the uneven emitting of water along the run of a length of porous pipe.

The improved porous irrigation pipe disclosed in my copending application Ser. No. 573,497 is made possible by accurate control of the water content of the raw material and by providing the raw material in a form in which it feeds consistently and reliably to the extruder. The improved pipe is produced by preprocessing the raw material into a shaped pellet form. This material feeds very consistently and reliably into a variety of types of single screw extruders. Additionally, the moisture content of the pellets can be adjusted to predetermined, specific values depending on the desired porosity and leak rate. The pellets are stored under water-excluding conditions such as in vapor barrier containers. The pellets are much less hygroscopic than the high surface area powder materials utilized by Turner.

Another difference in the production methods is that the use of a non-vented extruder becomes possible since water content is known and there is no need to vent excess vapor pressure. Since the parameters of water content and feed rate are controlled and the temperature is controllable, porosity can be controlled by preselection of water content of the pellets. Alternately, since all variables are controlled, porosity of a batch or run can be controlled by changing the temperatures in the extruder and die.

The porous pipe that is produced by extrusion of the pellets has extremely uniform porosity along its length and can provide very predictable and accurate watering cycles. This makes possible use of the improved porous pipe in a much expanded range of irrigation applications.

However, all of the extruded porous pipe developed to date, including the above-described uniform porosity pipe produced from pellets have a limitation. They only deliver a uniform leak rate over short lengths at the low pressures utilized in the field. Typically, a high pressure 50 psi inlet line is reduced to 15 psi or less by means of a regulator and fed to a header at the edge of the field. A length of porous pipe is connected to the low pressure header and is buried in the soil at the root level of the plants. The far end of the pipe is plugged. Since water is being continuously emitted along the length of the pipe as the column of water moves away from the header, the pressure continuously drops. Pressure also drops due to friction as the water moves toward the plug end of the pipe. Thus, in any normal system, much more water leaks into the soil near the inlet-header end than is emitted at the far end of the pipe. This leads to a number of problems in the field such as overwatering near the header and underwatering adjacent the far end of the pipe. These factors combine to limit the practical length of porous pipe which can be connected to an inlet manifold. The pressure drop, porosity and frictional effects limit practical runs of porous pipe to 500 feet or less. In large fields having runs of 2,000 feet or more, many manifolds must be utilized greatly increasing the cost of the system.

One way to overcome this problem would be to make a porous pipe having a low leak rate near the inlet, where the pressure is high, which gradually increases as the pressure drops along the pipe run. Done properly, it should be possible to maintain very even leak rates over very long runs of such a pipe. It has been estimated that in many applications porous pipe runs of several thousand feet would be possible, if the leak rate of the pipe could be varied correctly.

In the past, it has not been possible to produce such a pipe because the production methods were poorly controlled, varying 25 to 75 percent over short runs of pipes which are designed to have uniform porosity. Small changes in processing variables produce substantial changes in the product.

STATEMENTS OF THE INVENTION

Porous pipe has been produced in accordance with the present invention having a porosity which varies continuously and controllably. The porous pipe of the invention has a very smooth interior wall surface making possible very long runs of pipe having a substanially equal leak rate at continually lower pressure from the inlet to the stopped end of the pipe. Porous pipe can be produced according to the invention having a leak rate optimized for a specific application so that the pattern of pipes yields the same amount of water throughout a field without the use of extensive and expensive manifold systems. The porous pipe of the invention is especially useful in large fields where the cost of numerous manifolds, associated pumps and energy have been prohibitively expensive.

The method of the invention proceeds with the use of the moisture-controlled, unvented extruder process and system as described in my earlier copending application, Ser. No. 573,497. All the production variables except the extruder temperature or pull-off rate are controlled to produce a porous pipe having an increasing porosity which provides an even leak rate at gradually decreasing pressure.

In the preferred method, all of the production parameters except the extruder die temperature are held constant. The temperature of the die, and thus the temperature of the extrudate, are varied according to a predetermined schedule, producing a predetermined, gradually varying porosity in the final pipe. By using a die system with a long land length and very good temperature control, it is possible to obtain very close control of the leak rate of the pipe over a broad range of pressures.

In the second method, all of the production variables of the extruder, die and cooling system are held constant, while varying the pull-off rate of the tractor system. This essentially varies the density of the tubing wall, since no changes have been found in the overall dimensions of the final graduated leak rate pipes produced by this method versus those of pipes made under the same conditions with constant leak rates at constant pressure. This method suffers from the fact that rather small changes in the pull-off rate produce large changes in the leak rate of the pipe. For example, with all other conditions held constant, a change of 0.5 ft/min in the pull-off rate of 9/16 inch ID porous pipe produced a change of approximately 50 GPH/100 ft. of the pipe. This corresponds to a difference in leak rate of 1 GPH/100 ft. for each change of 0.01 ft/min in the pull-off rate. It is difficult to build a mechanical puller for pipe which will run at a constant rate within 0.01 ft/min., and almost impossible to control variations of such small magnitude with state-of-the-are pulling mechanisms. It should be noted that these tests were run at very low speed, and the speed was varied about 10 percent. At higher production rates, the speed variable will be changed a much smaller percentage in order to provide the desired variance in leak rate. The speed variation will be much easier to control under industrial manufacturing conditions.

However, the leak rate variation is still more even along the length of pipes produced by varying the die temperature as compared to those made by varying the pull-off rate. The temperature control provided by electronic controllers is much more sensitive, precise and stable than mechanical devices for varying the speed of the puller.

The porous pipe of the invention can achieve a linearly of flow, $C_v = 0.1$ or less, and can have a coefficient of friction at least 20 percent better than prior porous pipes of this nature. Runs of pipe can be up to 2000 to 3000 feet or more and yield of crops such as soybeans and peaches is expected to increase from 10 to 50 percent while water use is up to 50 percent less.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a schematic view of a first system for producing controlled variable porosity pipe according to the invention;

FIG. 2 is a schematic view of a second system for producing controlled variable porosity pipe;

DETAILED DESCRIPTION OF THE INVENTION

Figures 3, 4, 5:
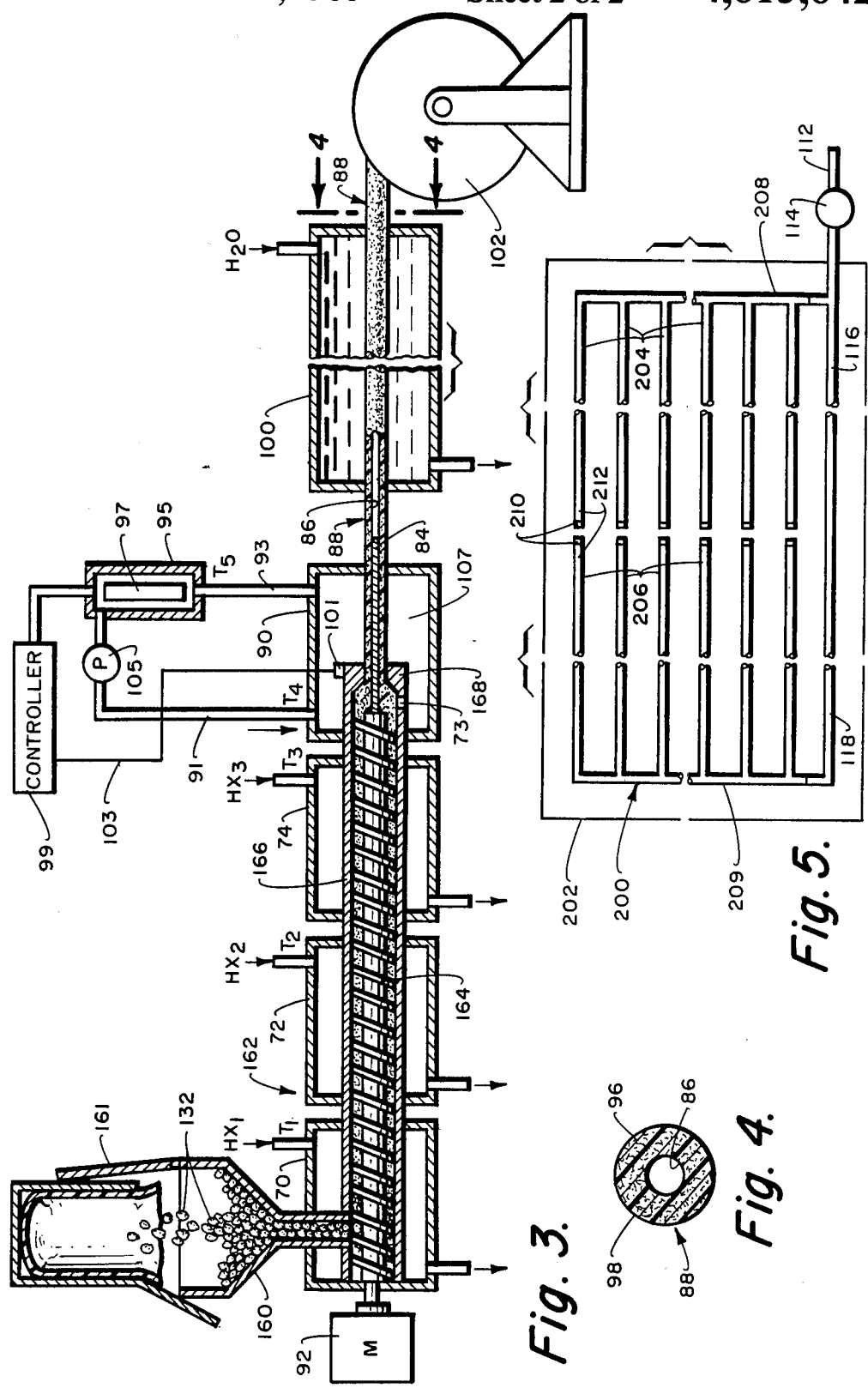
FIG. 3 is a more detailed schematic view of a die temperature controlled system.
FIG. 4 is a cross-section of the pipe.
FIG. 5 is a diagrammatic illustration of an irrigation system.

The invention proceeds by extrusion of a mixture of particulate, prevulcanized rubber and a thermoplastic resin having a uniform low moisture content, below 3 percent, preferably below 1 percent by weight. The mixture may be preformed into particles or pellets having a uniform size and profile which reliably feeds into a screw extruder. The extruder is operated with all variables controlled except for temperature of the die or pull-off rate. The extruder may be divided into zones having separate heating jackets and separately supplied heating fluids which may be at different temperatures.

However, the die is separately heated and is subjected to a gradually varying temperature over a time period corresponding to a predetermined length of porous pipe. The temperature can be continuously raised or continuously decreased over a predetermined run. Both modes may be run consecutively. For example, the temperature of the die can be raised from a minimum to a maximum over 1000 feet of run and then reversed and the temperature of the die continuously lowered over the next 1000 feet of run.

The pipe is manufactured by extrusion of a mixture containing a major portion of prevulcanized elastomer particles and a minor amount of a thermoplastic binder having a melting temperature below the decomposition temperature of the elastomer. During extrusion, the thermoplastic particles flow to form a binder phase surrounding and coating the elastomer particles. Pores form extending from the inner wall to the outer wall during extrusion of the mixture through the outlet die. These pores leak water when the pipe contains water at pressures at 1 psi or higher. The mixture preferably has a uniform water content below 5 percent, usually at a value 0.1 to 3 percent by weight and not varying more than ±10 percent throughout the batch.

The mixture is preferably formed into pellets having diameters from about 3 to 20 mm and having a bulk density about 0.2 to about 0.30 gm/cc. Pelletization and extrusion of pipe is facilitated by including 1.0 to 6 phr of a slip agent, usually a mineral such as talc and 0.1 to 1.0 phr of a lubricant such as a metal stearate.

The elastomer can be natural rubber which is cis-1,4-polyisoprene or synthetic homopolymers of butadiene or isoprene or their copolymers with minor amounts of 0.1 to 20 percent by weight of vinyl monomers such as styrene, isobutylene or acrylonitrite. It is preferred that the elastomer be vulcanized. A ready and inexpensive source of prevulcanized crumb rubber is available as rubber reclaimed from automobile tires after removal of the metal tire cords and metal reinforcement in the bead. Another source of rubber particles is flashing from newly manufactured tires. The rubber is ground into crumb particles no larger than those passing through a 10 mesh screen, preferably from 20 mesh to 60 mesh.

The binder resin is a thermoplastic material capable of softening at a temperature below 300° F. so that pores will form during extrusion. The resin must be stable to longterm exposure to soil environment and to fertilizers, herbicides or pesticides seeping into the adjacent soil or to fertilizers, growth regulators, herbicides or pesticides dispensed by dissolving in the irrigation water. The resin must be inert to the other components of the pipe such as the crumb rubber under extrusion conditions. Polyvinyl acetate is excluded from use since it will react with the crumb rubber. Styrene polymers including impact polystyrene copolymers are useful as are linear polamides such as various nylons, polyvinylchloride, polypheneylene oxide and polypheneylene sulfide polymers.

The most preferred group of polymers are the linear polymers of alkenes of 2 to 4 carbon atoms such as polyethylene, polypropylene or polybutene. These polymers are unreactive in soil and in the extrusion barrel and have long segments of linearity providing crystalline behavior. Polyethylenes have lower melting temperatures, are tougher and hold shape better. High density polyethylenes have densities from about 0.94 to about 0.97 gm/cc, and porous pipe prepared with all high density polyethylene binder are somewhat stiff, brittle and difficult to extrude. Low density polyethylenes have densities from about 0.90 to 0.93 gm/cc, and porous pipe prepared with all low density polyethylene binder are very flexible and can readily be bent to follow a desired path and are readily extruded. These pipes are very useful for above-ground irrigation. However, wall stiffness may not be adequate for subsurface systems. The pipe develops kinks in the bends and does not hold its shape. The optimum binder which provides a porous pipe which holds its shape without brittleness yet has adequate flexibility is composed of 50 percent to 80 percent by weight of high density polyethylene, preferably 60 percent to 70 percent to 20 percent to 80 percent by weight of low density polyethylene, preferably 30 to 40 percent. The polyethylene can be used in any commercial form such as powder, flake or pellets. Reclaimed polyethylene materials can also be used. The form and color of such materials have little effect upon the product.

The slip agent aids in extruding the rubber binder mixture. Finely divided minerals other than talc can be utilized such as clays, silicas, carbonates, or micas. The metal stearate lubricant can be selected from calcium, magnesium or zinc stearates.

The first embodiment of a system for producing controlled, graduated variable porosity pipe is illustrated in FIG. 1. The system 10 includes an extruder 12, a temperature controlled die assembly 14, a windup stand 16 and feed hopper 18. The die assembly 14 comprises a die 20 having a cylindrical cavity 22. A conventional rod mandrell 24 is mounted in the end of the extrusion screw 26 for forming the bore of the porous pipe. The die can be heated by electrical elements or heat exchange fluid. As shown, the die 20 is surrounded by a housing 28 containing a cavity 21 through which a heat exchange fluid, $HX_4$, circulates. The fluid circulates through a path containing a heat exchanger 30 and a pump 32. The heat exchanger contains a closed element such as a shell or a tube bank 33 for controlling the temperature by heat exchange with a secondary fluid such as water. The water circulates in a secondary loop 35 containing a heater such as a tube bank 37 and a pump 39. The tube bank 37 is disposed within a heater 41 such as a gas fired furnace. The operation of the heater 41 and the pump 39 can be controlled by a controller 45. A temperature sensor 36 may be attached to the die 20 and its signal fed to the controller 45. The controller may be operated manually to gradually raise or lower the temperature as the pipe is extruded or can be automatically operated to control the die temperature. An electrical or mechanical timer can be connected to the controller to linearly raise or lower the temperature of the water in the secondary loop 35 over a set time period determined by the speed of the windup stand 16 and the starting and final die temperatures for a given length of porous pipe. The controller can be operated to run alternating lengths of pipe by gradually increasing the die temperature over a first run by increasing the combustion temperature in the heater 41 by gradually increasing the flow rate of combustion gas and air to the furnace. The furnace is then turned off and the flow rate of ambient water from inlet 47 through the loop 35 is continued to gradually decrease the temperature of HX$_4$ to the starting temperature. The cycle is then repeated.

The system 10 may also include a chiller 38 positioned between the extruder 12 and the windup stand 16 to cool and set the pipe before entering the windup reel. The chiller receives a flow of water, usually at 20° F. to 40° F. The extruder includes a feed hopper 18, a barrel 42, a screw 26 and a motor 46 for rotating screw 44 within the barrel. The wall of the barrel is preferably temperature controlled by means of cavities 48, 50 and 52 receiving flows of heat exchange fluids, HX$_1$, HX$_2$ and HX$_3$ at temperature T$_1$, T$_2$ and T$_3$, respectively. The temperature of the barrel usually increases toward the die.

In the embodiment shown in FIG. 2, all variables including the die temperature are held constant and the speed of pull-off is varied by means of the controller 58 varying the speed of the drive motor 60 for take up stand 16. In industrial practice, a motorized tractor receives the porous pipe from the chiller and carries it to the windup stand. The speed of the tractor can be gradually increased to vary the porosity of the pipe. The heat exchange fluid, HX$_4$, is maintained at constant temperature as it circulates through a cavity 62 in housing 64 by means of a heater 66. The barrel of the extruder 12 may contain a single cavity 68 through which a heat exchange fluid heated by a heater 67 circulates.

A more detailed system is shown in FIG. 3. The system is illustrated using preformed pellets of the elastomer and binder.

Referring now to FIG. 3, the pellets 132 are fed to hopper 160 of a pipe extruder 162. The hopper has a lid 161 to isolate the feed from the environment. The extruder preferably contains a single low pressure screw 164 and has a length to diameter ratio of at least 24/1, preferably at least 35/1. The compression ratio of the feeding section to the metering section can be from 1.5/1 to 2.2/1. The diameter of the barrel 166 is suitable to produce pipes having outside diameters from 2 to 10 inches, usually from 3 to 6 inches. Mixing pins are to be avoided since the crumb rubber can foul these elements.

The process is operated at a temperature high enough to melt the binder resin but below the melting temperature of the elastomer. Good temperature control of the barrel is required usually to within ±5° F. A more uniform porous pipe is prepared by providing an increasing temperature profile over the length of extruder 162. Separate heating jackets 70, 72, 74 can surround the feeding, transition and metering sections, respectively, of the extruder barrel 166. Each jacket receives a separate flow of heat exchange fluid. The feeding section can be heated to 340° F.-360° F. (T$_1$), the transition section from 360° F.-370° F. (T$_2$), and the metering section from 365° F.-375° F. (T$_3$).

The die 168 is also provided with a separate but variable temperature control. A suitable die is shown in FIG. 5 of U.S. Pat. No. 4,168,799. The die 168 contains an outlet orifice 73 in front of which is mounted a mandrel 84 for forming the bore 86 of the porous pipe 88. The mandrel may be removable to vary the wall thickness of the pipe. The thickness is selected depending on desired flow rate, leak rate and wall strength to avoid collapse. Wall thickness is usually from 0.1 to 2.0 inches.

In accordance with the present invention, the barrel need not be vented and the die is controllably heated to temperatures continuously varying from 240° F. to 300° F. to control and vary porosity of the porous pipe. An annular jacket 90 receives a flow of preheated heat exchange fluid HX$_4$ at a temperature (T$_4$) through inlet 91. The fluid HX$_4$ circulates in a cavity 107 past the die 168 and is recovered through outlet 93 at temperature T$_5$. The fluid then enters the heater 95 and flows past an electrical heating element 97 and is heated to the temperature of the element determined by the controller 99. A signal from die temperature sensor 101 may be fed by line 103 to the controller 99. The fluid heated to temperature T$_4$ is returned by means of pump 105 to the inlet 91.

As the screw 164 is rotated by the motor 92, the feed moves forwardly and the binder resin melts. The resin flows around the particles and a network of pores 96 forms extending from the bore 86 to the surface 98 of the porous pipe. The pipe 88 can be extruded through the die 168 into the ambient and enters a chilling bath 100 containing water at a temperature of about 25° F. to 50° F. before being pulled onto windup stand 102. The chiller bath 100 usually has a length of at least 40 feet.

The invention will now be illustrated by the following specific examples of practice.

The dry materials were mixed in a ribbon blender and fed into the hopper of a twin-screw extruder heated to 360° F.-390° F. with a 5 mm die heated to 300° F. The water bath was maintained at 35° F.-40° F. and the 5 mm strand was chopped into approximately ground pellets about 8-9 mm in diameter by an air knife. After drying, the pellets had a density of 0.275 gm/m.

EXAMPLE 1

The following mixture was pelletized and dried to 0.75 percent moisture content.

| | |
|---|---|
| Crumbed Tire Rubber (48 Mesh) | 100 lb. |
| Low Density Polyethylene | 35 lb. |
| Finely Powdered Talc | 3 lb. |
| Zinc Stearate | .25 lb. |

These pellets were extruded in an unvented single screw extruder into porous pipe with an ID of 0.55 inch and a wall thickness of 0.2 inch. The extruder temperatures were:

| | |
|---|---|
| Extruder (all zones) | 350° F. |
| Gate | 340° F. |

| | -continued | |
|---|---|---|
| | Spider | 335° F. |
| | Die | 335° F. |

This porous pipe has the following properties at psi:
0.27±0.2 GPM/100 Linear Feet
0.11±0.003 GPM/100 Square Feet

EXAMPLE 2

This same pelletized raw material of Example 1 was extruded under the same conditions, except that the die temperature was 290° F. This pipe had the following properties at 10 psi:
0.19±0.17 GPM/100 Linear Feet
0.076±0.007 GPM/100 Square Feet.

EXAMPLE 3

Example 1 was repeated except that 35 lb. of high density polyethylene was substituted for the low density polyethylene binder. The pellets were more difficult to extrude and the pipe was more brittle and less flexible.

EXAMPLE 4

| | |
|---|---|
| Crumbed Tire Rubber (40 Mesh) | 100 lb. |
| High Density Polyethylene | 25 lb. |
| Low Density Polyethylene | 10 lb. |
| Slip Agent-Talc | 3 lb. |
| Lubricant-Calcium Stearate | .25 lb. |

The formulation was processed into pellets and dried to contain 1.0 percent moisture. The pellets were extruded in a 2.5 inch diameter, 24/1 L/D, Prodex single-screw extruder. The extruder was equipped with a PVC type screw, which had a compression ratio of 1.9/1, and a circular pipe die with a land-length of 16/1. Temperatures in the extruder were maintained at 340° F.–360° F. The gate, spider and die temperatures were adjusted to yield an extrudate having the temperatures shown below. Porous pipes having a wall thickness of 0.165 inch were produced having the following properties:

TABLE 1

| | APPROXIMATE LEAK RATE | | |
|---|---|---|---|
| Extrudate | | GPM/100 Linear Feet | |
| Temperature (°F.) | GPM/100 sq ft | 0.5" ID Pipe | 1.0" ID Pipe |
| 250–260 | 0.10 ± 0.02 | 0.25 ± 0.04 | 0.50 ± 0.08 |
| 275–285 | 0.20 ± 0.03 | 0.50 ± 0.08 | 1.00 ± 0.16 |
| 300–320 | 0.40 ± 0.06 | 1.00 ± 0.16 | 2.00 ± 0.32 |
| 340–360 | 0.80 ± 0.12 | 2.00 ± 0.32 | 4.00 ± 0.64 |

The pellet material fed smoothly and the porous pipe had good compression strength, yet was flexible. The pipe had uniform porosity along its length. The consistency of leak rate is measured by determining the amount of flow of one foot increments over 50 feet of pipe to determine the consistency factor, Cv—the standard deviation/flow rate.

A one-half inch I.D. porous pipe having a flow rate of 1 gpm/100 linear feet at 10 psi pressure has a Cv of 0.1 to 0.15 and a porous pipe having a flow rate of 0.25 gpm/100 linear feet has a measured Cv of 0.05 to 0.1.

The data in Table 1 demonstrates that the leak rate at constant pressure can be varied by control of the die temperature. Therefore, a pipe can be manufactured having a constant leak rate at gradually decreasing pressure. Though the relationship of flow to pressure follows a parabolic curve, a pipe having porosity that varies linearly over length provides a close approximation of a constant leak rate over the pressure drops experienced in practice.

A run was conducted in which 9/16 inch I.D. was produced. The die temperature was maintained constant at 350° F. and all other parameters were held constant except that the pull-off rate was varied from about 5 feet per minute to 4.5 feet per minute, a change of 0.5 feet per minute. This produced a change of about 50 GPH/100 feet of the pipe. This corresponds to a leak rate of 1 GPH/100 feet for each change of 0.01 feet per minute in the pull-off rate.

Several more examples of porous pipe produced by varying the die temperature at a constant pull-off rate follow:

TABLE 2

| LENGTH ALONG THE PIPE | DIE TEMP. (DEG. F.) | LEAK RATE GPH/100' | EXTRUDER SET-UP (AT START) |
|---|---|---|---|
| 0 | 349 | 52 | ZONE TEMP (F.) |
| 10 | 346 | 58 | 1  360 |
| 20 | 343 | 63 | 2  360 |
| 30 | 340 | 68 | 3  340 |
| 40 | 337 | 72 | DIE 349 |
| 50 | 336 | 75 | SCREW 40 RPM |
| 60 | 335 | 76 | RATE = 5 FT/MIN |
| 70 | 333 | 78 | |
| 80 | 331 | 82 | |
| 90 | 330 | 83 | |
| 100 | 329 | 85 | |

TABLE 3

| LENGTH ALONG THE PIPE | DIE TEMP. (DEG. F.) | LEAK RATE (GPH/100') | EXTRUDER SET-UP (AT START) |
|---|---|---|---|
| 0 | 370 | 20 | ZONE TEMP (F.) |
| 20 | 368 | 25 | 1  370 |
| 40 | 365 | 27 | 2  375 |
| 60 | 363 | 31 | 3  355 |
| 80 | 360 | 35 | DIE 370 |
| 100 | 358 | 37 | SCREW 60 RPM |
| 120 | 357 | 40 | RATE = |
| 140 | 356 | 43 | 7.5 FT/MIN |
| 160 | 355 | 47 | |
| 180 | 353 | 51 | |
| 200 | 351 | 55 | |

TABLE 4

| LENGTH ALONG THE PIPE | DIE TEMP. (DEG. F.) | LEAK RATE GPH/100' | EXTRUDER SET-UP (AT START) |
|---|---|---|---|
| 0 | 377 | 12 | ZONE TEMP (F.) |
| 50 | 375 | 15 | 1  375 |
| 100 | 365 | 22 | 2  385 |
| 150 | 362 | 28 | 3  390 |
| 200 | 358 | 35 | DIE 377 |
| 250 | 355 | 39 | SCREW 60 RPM |
| 300 | 352 | 40 | RATE = |
| 350 | 348 | 44 | 7.5 FT/MIN |
| 400 | 344 | 52 | |
| 450 | 341 | 54 | |
| 500 | 338 | 61 | |

The gradual variation in porosity is much more even along the length of pipes produced by varying the temperature of the die as compared to those produced by varying the pull-off rate. It is expected that this will be true when scaled up to industrial operation since electronic temperature controllers are more reliable and precise than speed controllers especially since a yielding thermoplasticrubber is being pulled. Preferred industrial practice would be to control all constant variables with a computer and also control the variable parameter by means of a microprocessor specially programmed for control of pull-off speed or die temperature variation.

The porous pipe is found to have a very smooth wall having a Cv from 0.05 to 0.1 and a porosity varying up to 5 magnitudes over 500 feet. This makes possible the deployment of irrigation systems with very few headers, pumps and manifolds as illustrated in FIG. 5.

Referring now to FIG. 5, the system 200 is deployed in a field 202. Parallel runs 204, 206 of porous pipe at least 500 feet in length and suitably from 1000 feet to 3000 feet in length extend from header manifolds 208, 209. These pipes contain plugs 210 at their outer ends 212 and typically have an inner diameter of about 0.5 inch and a wall thickness of about 0.15 inch. The field is fed pressurized water from a municipal or well source such as a 4 inch diameter line 112 at 50 psi. The inlet pressure is reduced by means of pressure reducer 114 to about 15 psi and is fed by lines 116, 118 to the headers 208, 209. Water flowing at 20 gpm and 15 psi is found to give a constant leak rate throughout the field.

It is to be realized that only preferred embodiments of the invention have been described and that numerous substitutions, modifications and alterations are permissible without departing from the spirit and scope of the invention as defined in the following claims.

I claim:

1. An irrigation pipe comprising:
a length of porous, flexible pipe having an inlet and an outlet end; said pipe having a wall formed of a major portion of vulcanized elastomer particles dispersed in a minor portion of thermoplastic resin binder, said wall containing a continuous pattern of pores extending from the inside surface to the outside surface; the porosity of the length of pipe gradually and controllably increases from a first inlet end to a second outlet end of the length of pipe such that the leak rate is substantially constant throughout the length of the pipe as the pressure drops from the inlet end to the outlet end.

2. A pipe according to claim 1 in which said leak rate changes at least 100 percent over a length of 500 feet.

3. A pipe according to claim 2 having a length of up to 3000 feet, a diameter from ½ to 10 inches and a wall thickness from 0.1 to 2.0 inches.

4. A pipe according to claim 1 in which which the porosity increases linearly from the inlet end to the outlet end of the length of pipe.

5. A pipe according to claim 4 in which the mixture comprises:
100 parts by eight of particulate elastomer; and,
10 to 60 phr of a thermoplastic binder.

6. A pipe according to claim 5 in which the elastomer is vulcanized rubber.

7. A pipe according to claim 6 in which the binder has a melting temperature below 300° F.

8. A pipe according to claim 7 in which the binder resin is a linear polyethylene.

9. A pipe according to claim 8 in which the resin is a mixture of 50 percent to 80 percent by weight of high density polyethylene and 20 percent to 50 percent by weight of low denisty polyethylene.

10. A method of producing an irrigation pipe having a porosity that gradually and continuously changes with length comprising the steps of:
extruding from an unvented extruder through an extruder die a mixture of a major portion of elastomeric particles and a minor portion of thermoplastic binder having a moisture content below 5 percent by weight at a temperature above the melting temperature of the binder in the range between 320° F. and 400° F.; and
constantly varying the temperature of the extruder die or the speed of pull-off of pipe from the extruder die as the pipe is extruded to gradually vary the porosity along the length of the pipe.

11. A method according to claim 10 in which the temperature of the extruder die is constantly varied as a length of pipe is extruded 12. A method according to claim 11 in which the speed of pull-off of pipe from the extruder is constantly varied during extrusion of a length of pipe.

13. A method according to claim 10 in which all other parameters of extrusion except for the constantly varied die temperature of pull-off speed are held constant during extrusion.

14. A method according to claim 10 in which the mixture contains 100 parts of elastomer and 10 to 60 phr of the thermoplastic resin.

15. A method according to claim 11 in which the die is separately heated to a temperature controllably varying from 240° F. to 380° F.

16. A method according to claim 15 in which the die is gradually heated from a first temperature to a second temperature and then gradually cooled from the second temperature to the first temperature.

17. A method according to claim 16 in which the die is heated by heat exchange with a heat exchange fluid and said fluid is in turn heated by heat exchange with a second fluid.

* * * * *